3,052,725
PREPARATION OF ALKYLATED PENTABORANE
Elmar Robert Altwicker, Dayton, and Alfred B. Garrett, Columbus, Ohio, Earl A. Weilmuenster, Kenmore, N.Y., and Samuel W. Harris, Oxford, Ohio, assignors, by mesne assignments, to Olin Mathieson Chemical Corporation, a corporation of Virginia
No Drawing. Filed Oct. 12, 1955, Ser. No. 540,142
2 Claims. (Cl. 260—606.5)

Our invention relates to a method for the preparation of liquid alkylated pentaboranes, particularly alkylated pentaboranes containing from one to five carbon atoms in each alkyl radical.

Pentaborane may be prepared by methods described in the art; it is a colorless liquid which melts at −46.8° C. The boron hydrides and pentaborane in particular, because of their high heats of combustion, have been recognized as materials which are potentially of value as high energy fuel. The burning of these materials with oxygen creates considerably more energy than oxidation of a corresponding amount of hydrocarbon, producing very high flame temperatures. Pentaborane suffers, however, from several disadvantages; (1) it has a very disagreeable odor; (2) it has a relatively high vapor pressure, its vapor pressure being 66 mm. of mercury at 0° C. and its boiling point at atmospheric pressure being 58° C.; and (3) its vapors are highly toxic.

One of the objects of this invention is to provide a method for producing high energy liquid products less volatile than pentaborane but at the same time approaching pentaborane in heat of combustion. In accordance with the present invention it has been discovered that pentaborane and lower alkyl monohalides can be reacted in admixture with the alkylation catalyst ferric chloride to form liquid alkylated pentaboranes. The products produced in accordance with the method of our invention are borohydrocarbons of relatively high boron content and at the same time they are liquids having a somewhat lower vapor pressure than pentaborane itself, so that they constitute a conveniently handled fuel of considerably greater energy content than the simple hydrocarbon fuels.

In accordance with the present invention it has been discovered that pentaborane and alkyl halides containing from 1 to 5 carbon atoms can be reacted in the presence of the alkylation catalyst ferric chloride to form liquid alkylated pentaboranes which are stable, relatively non-volatile liquids, with convenient handling characteristics.

The preparation and manner of using liquid alkylated pentaboranes is described in Altwicker, Garrett, Weilmuenster and Harris application Serial No. 497,408, filed March 28, 1955.

The following examples illustrate in detail various embodiments which fall within the scope of our invention. In the example, the term "moles" means gram moles unless otherwise specified.

EXAMPLE I

In this experiment a 1270 ml. capacity stainless steel autoclave was charged with 0.65 mole of n-propyl chloride and 0.13 mole of anhydrous C.P. ferric chloride. The contents of the autoclave were then cooled by immersing the autoclave in a bath which was maintained at −78° C. In the next step a vacuum of less than 1 mm. Hg was applied to the reactor for about 30 minutes in order to remove any air or moisture present. Pentaborane (0.43 mole) was then added from a vessel of known volume and the reaction mixture was heated by means of a water-bath maintained at 70° C. During the reaction, which was carried out over a period of 2.25 hours, the reactor contents were stirred by means of a magnetic stirrer. During the heating period the pressure rose to a maximum of 175 p.s.i.g.

At the conclusion of the reaction the reaction mixture was then allowed to cool to room temperature. Gases present in the autoclave were then vented through a water trap. The water solution was titrated with standard base to determine the amount of hydrogen chloride evolved. The autoclave was opened and the contents were passed through a filter which was located in a dry box with a nitrogen atmosphere. The autoclave was rinsed with 32.3 g. of pentaborane and the rinse was passed over the filter cake. In the next step the filtrate was transferred to a still pot and 44.9 g. of pentaborane and about 5 cc. of n-propyl chloride were recovered in the forecut which was taken off up to a temperature of 120° C. At an overhead temperature of 120° C. the collection of propylpentaborane was commenced and 0.216 mole was recovered through the temperature range of 120°–127° C. The entire distillation operation was carried out at atmospheric pressure. Based on the amount of pentaborane consumed, the yield of propylpentaborane was 92 percent. The conversion of pentaborane was 54 percent. The percent boron in the product was shown by analysis to be 51.7 (calculated for $C_3H_7B_5H_8$, 51.5 percent).

By analysis the filter cake was found to contain 42.85 percent iron, 5.04 percent chlorine, 1.10 percent carbon, 2.10 percent hydrogen and 2.29 percent boron.

EXAMPLE II

A number of other experiments were performed (see Table I) in a manner identical to that described for experiment of Example I with the exception that the liquid portion of the reaction mixture was removed from the autoclave by evaporation at a reduced pressure (2 mm. Hg). The liquid removed was caught in a cold trap maintained at −78° C. From the cold trap the liquid alkylated product was transferred to a still and distilled in the same manner as described in Example I. This transfer was accomplished in a dry box with a nitrogen atmosphere.

Table I

| Exp. | A | B | C |
|---|---|---|---|
| $B_5H_9$, mole | 0.43 | 0.43 | 0.43 |
| n-$C_3H_7Cl$, mole | 0.65 | 0.65 | 0.65 |
| $FeCl_3$, mole | 0.043 | 0.043 | 0.043 |
| Max. Press., p.s.i.g | 155 | 182 | 192 |
| Temp., ° C | 70 | 60 | 60 |
| Time, hrs | 4.33 | 2.25 | 1.0 |
| Material Out: | | | |
|   HCl, mole | 0.200 | 0.380 | 0.380 |
|   Conv. $B_5H_9$ | 46 | | |
|   Percent Yield Propylpentaborane | 74 | | |
|   Percent B in Product | {47.9 / 47.8} | | |

Various modifications can be made in the procedures of the specific examples to provide other embodiments which fall within the scope of our invention. Thus, in place of the n-propyl chloride used there can be substituted equivalent amounts of other alkyl monohalides having from 1 to 5 carbon atoms such as methyl bromide, methyl chloride, ethyl chloride, ethyl iodide, n-propyl bromide, i-propyl iodide, n-butyl chloride, isobutyl bromide, sec-butyl chloride, ter-butyl iodide, n-amyl chloride, n-amyl-bromide and the like, as well as mixtures thereof. The relative proportions of pentaborane and alkyl monohalides present in the reaction mixture can be varied considerably without departing from the invention. In general, however, the molar ratio of alkyl monohalide to pentaborane employed in carrying out the reaction will be within the range from 1:1 to 1:6. To limit polyalkylation, it may be advantageous in commercial production of alkylated pentaboranes to carry out the reactions in the presence of a large excess of pentaborane. The reaction temperatures employed can be varied considerably, generally being in the range from about 30° C. to 100° C. Likewise, the quantity of ferric chloride can be varied widely; generally, from about 0.05 mole of ferric chloride to 1.0 mole of pentaborane to about 0.2 mole of ferric chloride to one mole of pentaborane, with the preferred range being from 0.08 mole of ferric chloride to 1.0 mole of pentaborane to about 0.15 mole of ferric chloride to 1.0 mole of pentaborane. In a similar manner, the reaction time may be varied through a wide range from about 0.5 hour to 10 hours. However, most reactions are substantially completed in from 1 to 3 hours.

We claim:
1. A method for the preparation of an alkylated pentaborane which comprises reacting pentaborane and an alkyl monohalide having from 1 to 5 carbon atoms while the reactants are in admixture with a catalytic amount of ferric chloride.
2. The method of claim 1 wherein the alkyl monohalide is n-propyl chloride.

References Cited in the file of this patent

Groggins: Unit Processes in Organic Synthesis, 4th ed. (1952), pp. 800 and 846–854 relied on.